(12) United States Patent
Chen

(10) Patent No.: US 11,865,670 B2
(45) Date of Patent: Jan. 9, 2024

(54) DEVICE FOR REMOVAL OF WHEEL RIM BURR

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

( * ) Notice: Subject to any disclaimer, the term of this patent is extended or adjusted under 35 U.S.C. 154(b) by 1037 days.

(21) Appl. No.: 16/738,110

(22) Filed: Jan. 9, 2020

(65) Prior Publication Data

US 2021/0213776 A1  Jul. 15, 2021

(51) Int. Cl.

| | |
|---|---|
| *B24B 5/06* | (2006.01) |
| *B24B 9/04* | (2006.01) |
| *B24B 19/18* | (2006.01) |
| *B24B 29/04* | (2006.01) |
| *B24B 5/44* | (2006.01) |
| *B24B 5/18* | (2006.01) |
| *B24B 41/06* | (2012.01) |
| *B24B 27/00* | (2006.01) |
| *B24B 29/00* | (2006.01) |

(52) U.S. Cl.
CPC .............. *B24B 5/44* (2013.01); *B24B 5/06* (2013.01); *B24B 5/185* (2013.01); *B24B 9/04* (2013.01); *B24B 19/18* (2013.01); *B24B 27/0076* (2013.01); *B24B 29/005* (2013.01); *B24B 29/04* (2013.01); *B24B 41/06* (2013.01); *B60B 2310/234* (2013.01); *B60B 2900/113* (2013.01)

(58) Field of Classification Search
CPC .. B24B 5/06; B24B 5/065; B24B 5/08; B24B 5/10; B24B 5/12; B24B 5/185; B24B 5/40; B24B 5/44; B24B 9/02; B24B 9/04; B24B 19/06; B24B 19/28; B24B 27/0023; B24B 27/0076; B24B 29/005; B24B 29/04; B24B 33/02; B24B 33/022; B24B 33/025; B24B 39/02; B24B 39/023; B24B 41/002; B24B 41/02; B24B 41/06; B24B 41/061; B24B 41/065; B24B 41/067; B60B 2310/234
USPC ..... 451/51, 52, 61, 180, 189, 190, 194, 204, 451/207, 209, 210, 242, 246, 254, 381, 451/398, 400, 402, 462
See application file for complete search history.

(56) References Cited

U.S. PATENT DOCUMENTS

| | | | | |
|---|---|---|---|---|
| 2,375,333 | A * | 5/1945 | Troendly | B24B 7/167 409/185 |
| 3,124,907 | A * | 3/1964 | Dralle | B24B 27/0076 125/11.01 |
| 3,688,447 | A * | 9/1972 | Uhtenwoldt | B24B 41/06 451/25 |
| 3,842,543 | A * | 10/1974 | Hohler | B24B 5/26 451/72 |

(Continued)

FOREIGN PATENT DOCUMENTS

| | | | | |
|---|---|---|---|---|
| GB | 2375333 | * | 5/1945 | |
| WO | WO-2012114576 A1 | * | 8/2012 | ............. B24B 19/06 |
| WO | WO-2016008202 A1 | * | 1/2016 | ............... B24B 9/04 |

*Primary Examiner* — Eileen P Morgan
(74) *Attorney, Agent, or Firm* — Rosenberg, Klein & Lee

(57) ABSTRACT

The present invention discloses a device for removal of wheel rim burr which comprises a main body, plural positioning wheels, an eccentric wheel disposed on the main body, and at least two brush wheels disposed between two corresponding positioning wheels.

7 Claims, 6 Drawing Sheets

(56) References Cited

U.S. PATENT DOCUMENTS

| | | | | |
|---|---|---|---|---|
| 3,903,656 | A | * | 9/1975 | Binder ................ B24B 27/0023 451/247 |
| 4,532,665 | A | * | 8/1985 | Evans ..................... B60B 21/00 15/88.4 |
| 6,957,999 | B1 | * | 10/2005 | Motta ..................... B24B 29/04 451/28 |
| 2018/0001436 | A1 | * | 1/2018 | Xue ........................ B24B 41/06 |

* cited by examiner

DEVICE FOR REMOVAL OF WHEEL RIM BURR

BACKGROUND OF THE INVENTION

1. Field of the Invention

The present invention relates to a device for removal of wheel rim burr which removes burrs on an edge of a spoke hole of a wheel rim automatically.

2. Description of Related Art

A conventional method for manufacturing a wheel rim made of aluminum alloy comprises the steps of pull-extruding an aluminum alloy material into an aluminum alloy long bar, rounding the aluminum alloy long bar into an aluminum alloy ring by a rolling machine, connecting two ends of the aluminum alloy ring to obtain a wheel rim, drilling plural spoke holes at an internal side of the wheel rim for passing through and assembling with plural spoke wires.

Burrs are generated at edges of the spoke holes after drilling. In order to reduce difficulties of assembling the spoke wires, the burrs at the edges of the spoke holes must be removed. In the conventional method, burrs on the edges of the spoke holes are removed by a worker holds a sandpaper or other tools to grind the burrs. However, the conventional method requires a lot of manpower and is time-consuming to remove burrs on the spoke holes by manpower, so it has increased production cost. In addition, workers removing burrs on the spoke holes may be accidently injured by the sandpaper, the tools or the burrs on the spoke holes. If the workers are careless in operation, it may also cause incomplete removal of burrs and increases the defective rate of a product.

SUMMARY OF THE INVENTION

The present invention discloses a device for removal of wheel rim burr which removes burrs on an edge of a spoke hole of a wheel rim automatically.

The device for removal of wheel rim burr of the present invention comprises a main body, plural positioning wheels, an eccentric wheel disposed on the main body, and at least two brush wheels disposed between two corresponding positioning wheels. Accordingly, a wheel rim is placed on the plural positioning wheels and contacts the positioning wheels and the eccentric wheel by an outer side. The brush wheels contacts an inner side of the wheel rim. When the wheel rim is driven by the eccentric wheel to spin, and the wheel rim sways back and forth so as to increase friction between the inner side thereof and the brush wheels. Therefore, burrs on the edge of the spoke holes are removed automatically and thoroughly by the present invention.

DETAILED DESCRIPTION OF THE PREFERRED EMBODIMENT

Figure 1:
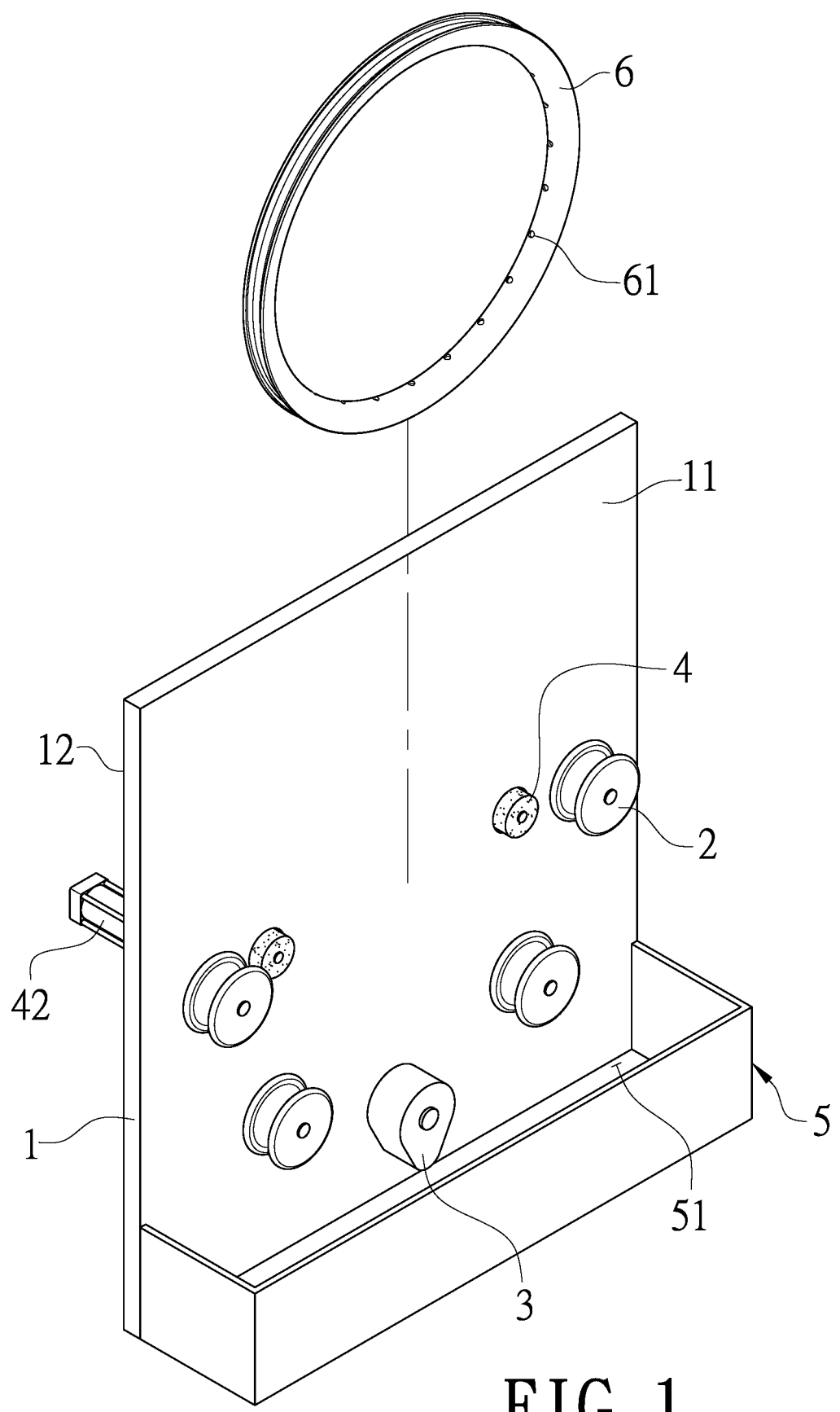
FIG. 1 is a stereogram showing a front view of a device for removal of wheel rim burr of the present invention.
Figure 2:
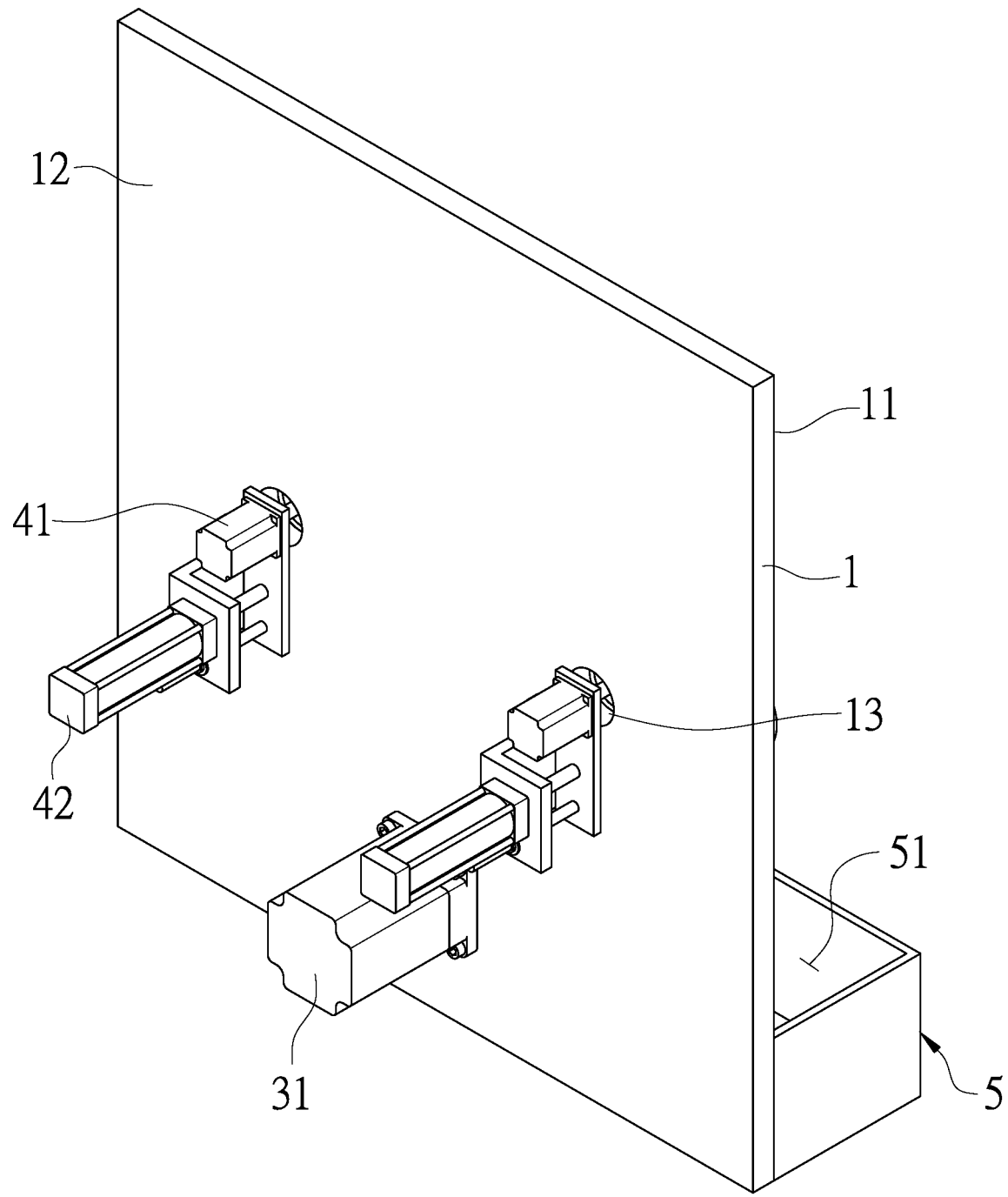
FIG. 2 is a stereogram showing a back view of a device for removal of wheel rim burr of the present invention.

Referring to FIG. 1 and FIG. 2, a device for removal of wheel rim burr of the present invention comprises a main body (1), an even number of plural positioning wheels (2), an eccentric wheel (3) and at least two brush wheels (4). The main body (1) has a first end surface (11), a second end surface (12) opposite to the first end surface (11), and plural through holes (13) penetrating the first end surface (11) and the second end surface (12).

A reference vertical center line (A) is projected through the first end surface (11) of the main body (1). The even number of plural positioning wheels (2) are disposed on the first end surface (11). Every two of the plural positioning wheels (2) are arranged opposite to each other from the reference vertical center line (A) of the first end surface (11) of the main body (1), and a center of each of the two opposing positioning wheels (2) is equidistant from the reference vertical center line (A) of the first end surface (11) of the main body (1). The distance between the center of each of the two opposing positioning wheels (2) and the reference vertical center line (A) of the first end surface (11) of the main body (1) is smaller as the even number of opposing positioning wheels (2) goes downward, and the even number of plural opposing positioning wheels (2) are arranged in a semicircular path about a wheel rim (6).

The eccentric wheel (3) is disposed in a middle position below the two lowermost positioning wheels (2) of the plural positioning wheels (2) on the first end surface (11). The main body (1) is provided with a first rotary power source (31) disposed on the second end surface (12) thereof for connecting the eccentric wheel (3) by a first rotating shaft, and the first rotary power source (31) can be a reduction motor.

The at least two brush wheels (4) are disposed between the two corresponding positioning wheels (2) on the first end surface (11). The at least two brush wheels (4) passes through the plural through holes (13) on the main body (1). Each of the at least two brush wheels (4) is provided with a second rotary power source (41) and the second rotary power source (41) is a motor. The second rotary power source (41) is disposed on the second end surface (12) of the main body (1) for connecting each of the at least two brush wheels (4) by a second rotating shaft. A telescopic power source (42) is further provided and is disposed on the second end surface (12) of the main body (1) next to the second rotary power source (41). The telescopic power source (42) connects the second rotary power source (41) by an output shaft thereof, and the telescopic power source (42) can be a pneumatic cylinder.

The present invention further comprises a collecting member (5) on the first end surface (11) below the plural positioning wheels (2) and the eccentric wheel (3). The collecting member (5) is a collecting tank (51) having an opening.

Figure 3:
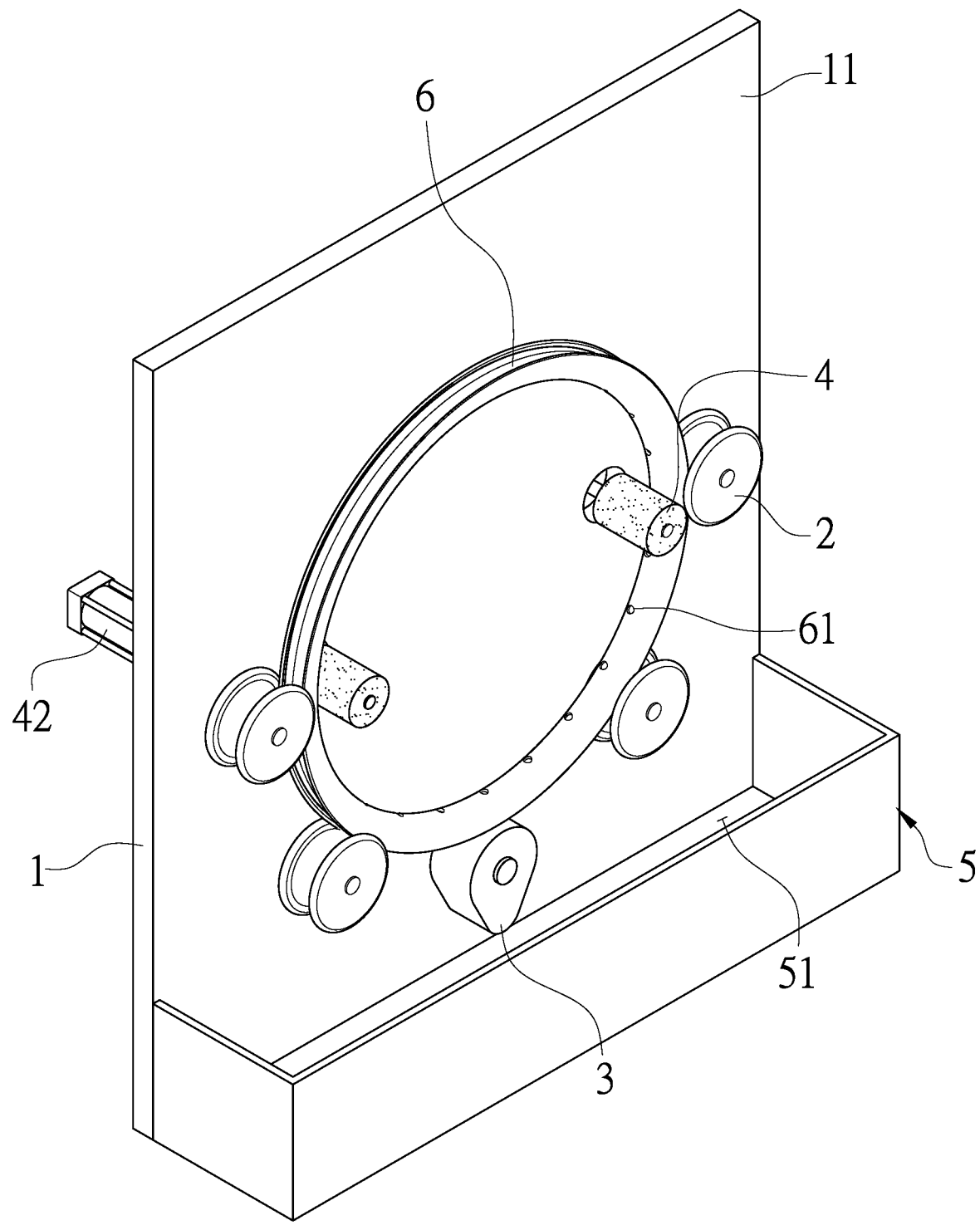
FIG. 3 is a stereogram showing a device for removal of wheel rim burr of the present invention in a working state.
Figure 4:
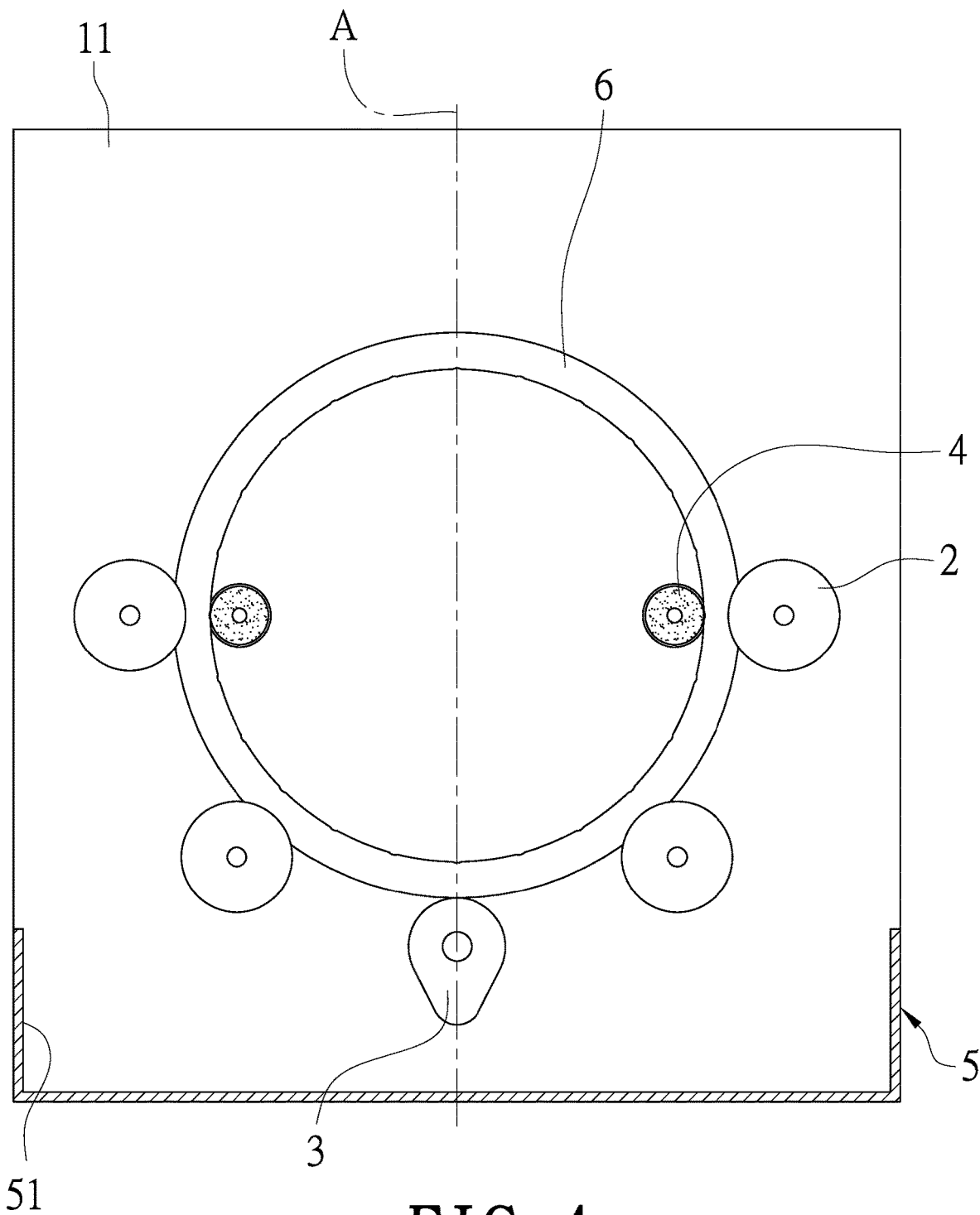
FIG. 4 is a front sectional view of the FIG. 3 showing the present invention in a working state.
Figure 5:
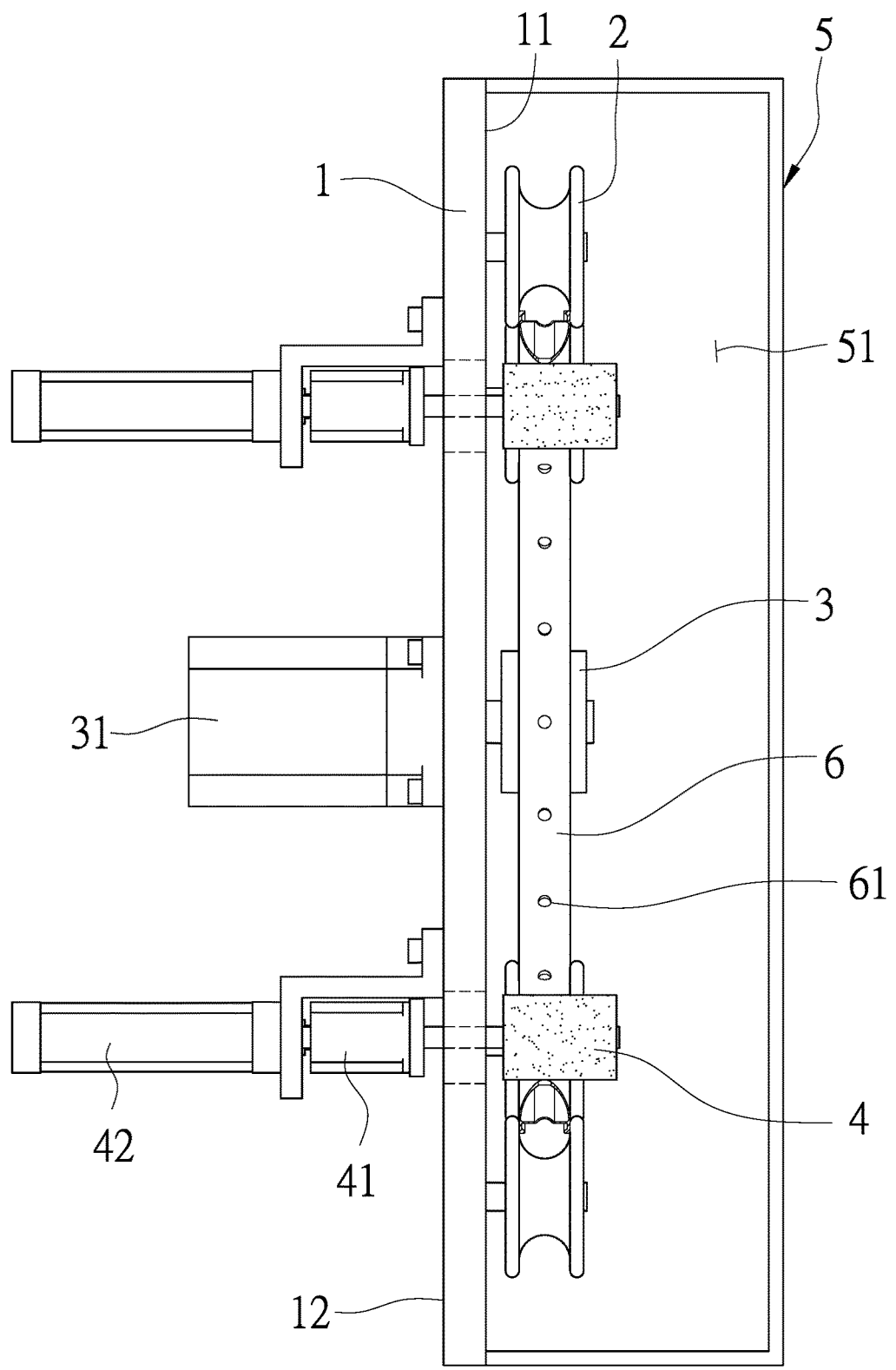
FIG. 5 is a top sectional view of the FIG. 3 showing the present invention in a working state.

Referring to FIG. 3 to FIG. 5, a working state of the present invention is disclosed. The wheel rim (6) having plural spoke holes (61) on an internal side is placed on the plural positioning wheels (2) for positioning, and the wheel rim (6) contacts the positioning wheels (2) by an outer side. In addition, the wheel rim (6) placed on the plural positioning wheels (2) contacts the eccentric wheel (3) by a bottom of the outer side. The two telescopic power sources (42) are driven to extend the two brush wheels (4) from the first end surface (11) of the main body (1), and the two brush wheels (4) contact an internal side of the wheel rim (6).

Figure 6:
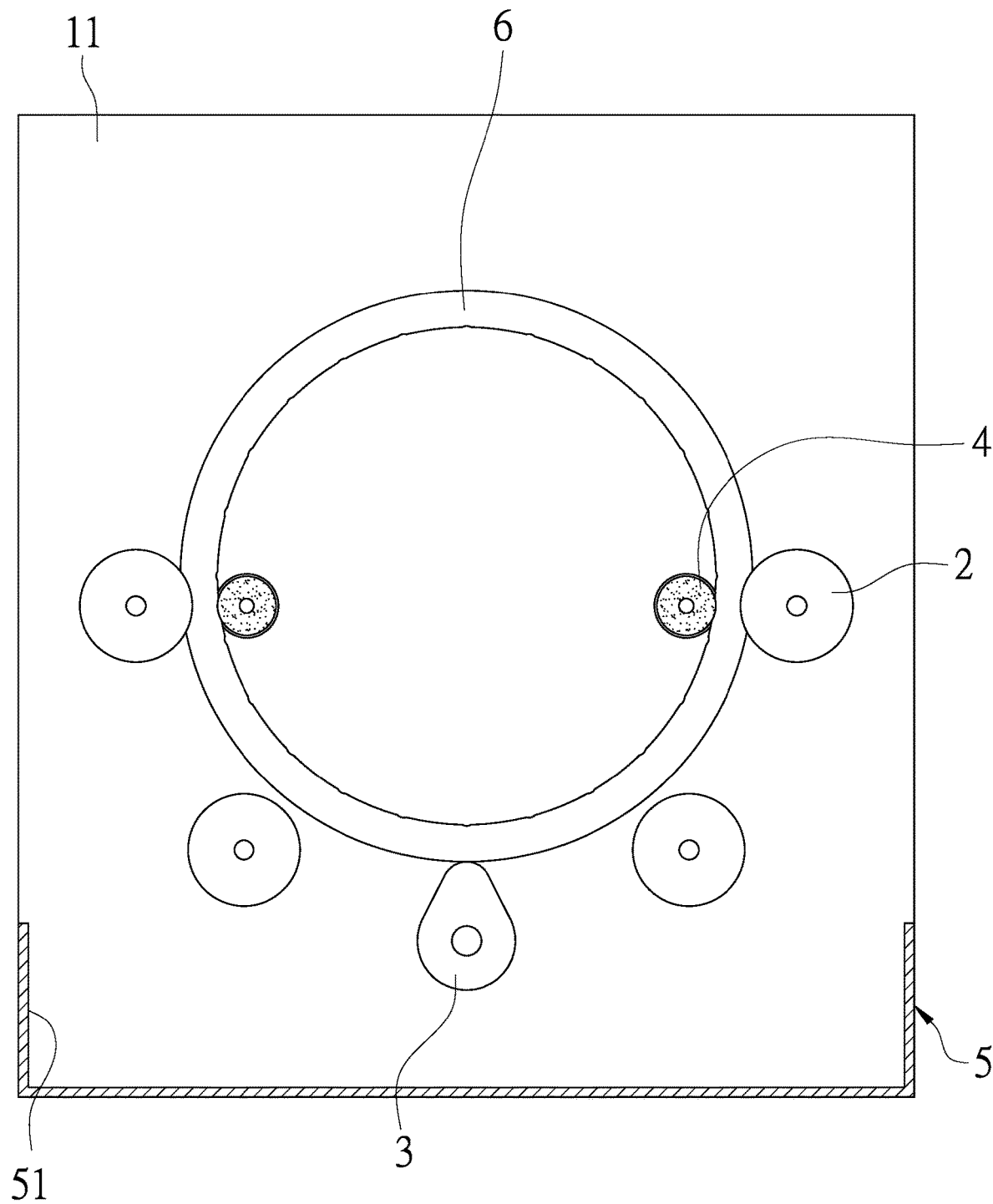
FIG. 6 is a front sectional view showing a wheel rim of the present invention in a spinning state.

Referring to FIG. 6, the first rotary power source (31) is turned on to drive the eccentric wheel (3) to spin, and then the eccentric wheel (3) drives the wheel rim (6) to spin. The second rotary power source (41) is also turned on to drive the two brush wheels (4) to spin and remove burrs on the edges of the spoke holes (61) of the wheel rim (6). At the meantime, the spinning wheel rim (6) also sways back and forth so as to increase friction between the edges of the spoke holes (61) of the wheel rim (6) and the brush wheels (4). Therefore, the brush wheels (4) remove the burrs on the edges of the spoke holes (61) completely. The burrs removed from the spoke holes (61) of the wheel rim (6) is collected by the collecting tank (51) of the collecting member (5) below the plural positioning wheels (2) and the eccentric wheel (3).

After removing the burrs on the edges of the spoke holes (61) of the wheel rim (6), the first rotary power source (31) and the second rotary power source (41) are turned off, and the two brush wheels (4) are driven to move toward the second end surface (12) of the main body (1) by the two telescopic power sources (42) and placed in the through holes (13). After the two brush wheels (4) are moved into the through holes (13), the wheel rim (6) can be removed conveniently from the present invention for further processing.

Accordingly, the device for removal of wheel rim burr of the present invention removes burrs on edges of the spoke holes (61) of the wheel rim (6) automatically and thoroughly which saves manpower for removing burrs on edges of the spoke holes (61) so as to reduce production cost. The present invention also prevents injuries of the workers removing burrs on the spoke holes (61) by using the sandpapers, the tools or the burrs on the spoke holes (61). Furthermore, the yield rate of the product is also increased since the present invention prevents incomplete removal of burrs by workers careless in operation.

What is claimed is:

1. A device for removal of wheel rim burr, comprising:
   a main body having a first end surface, a second end surface opposite to the first end surface, and plural through holes penetrating the first end surface and the second end surface;
   an even number of plural positioning wheels disposed on the first end surface of the main body whereby at least two pairs of positioning wheels are disposed on the first end surface of the main body, every two of the positioning wheels of a corresponding pair of the positioning wheels are arranged opposite to each other with respect to a reference vertical center line projected through the first end surface of the main body, and a center of each of two opposing positioning wheels of a corresponding pair of the positioning wheels is equidistant from the reference vertical center line;
   an eccentric wheel disposed in a middle position below two positioning wheels of the plural positioning wheels located lowest on the first end surface, wherein the main body is provided with a first rotary power source disposed on the second end surface thereof, and wherein the first rotary power source is connected to the eccentric wheel by a first rotating shaft;
   at least two brush wheels disposed between a corresponding pair of the positioning wheels and passing through respective plural through holes on the main body, wherein each of the at least two brush wheels is provided with a second rotary power source disposed on the second end surface of the main body, and wherein each second rotary power source is connected to a corresponding one of the at least two brush wheels by a respective second rotating shaft, and two telescopic power sources, wherein each telescopic power source is disposed on the second end surface of the main body adjacent to a corresponding one of the two second rotary power sources, and wherein each telescopic power source is connected to a corresponding second rotary power source by an output shaft of the respective telescopic power source.

2. The device for removal of wheel rim burr as claimed in claim 1, wherein a distance between the center of each of two opposing positioning wheels of a corresponding pair of positioning wheels and the reference vertical center line of the first end surface of the main body becomes smaller going downwards towards positioning wheels located at a bottom portion of the first end surface of the main body, and the even number of plural positioning wheels are arranged in a semicircular path about a wheel rim.

3. The device for removal of wheel rim burr as claimed in claim 1, wherein the first end surface is provided with a collecting member disposed below the plural positioning wheels and the eccentric wheel.

4. The device for removal of wheel rim burr as claimed in claim 3, wherein the collecting member is a collecting tank having an opening.

5. The device for removal of wheel rim burr as claimed in claim 1, wherein the first rotary power source is a reduction motor.

6. The device for removal of wheel rim burr as claimed in claim 1, wherein each of the second rotary power sources is a motor.

7. The device for removal of wheel rim burr as claimed in claim 1, wherein each of the telescopic power sources is a pneumatic cylinder.

* * * * *